United States Patent [19]
Moore

[11] Patent Number: 4,908,131
[45] Date of Patent: Mar. 13, 1990

[54] AERATION DEVICE

[76] Inventor: Thomas R. Moore, Rte. 7, Box 322, Dickson, Tenn. 37055

[21] Appl. No.: 144,057

[22] Filed: Jan. 15, 1988

[51] Int. Cl.⁴ .......... B01F 3/04; C02F 7/00
[52] U.S. Cl. .......... 210/219; 261/92
[58] Field of Search .......... 261/91, 92; 210/150, 210/151, 219, 220, 619, 758

[56] References Cited

U.S. PATENT DOCUMENTS

| | | | |
|---|---|---|---|
| 44,560 | 10/1864 | Simonds | 261/92 |
| D. 245,270 | 8/1977 | Williams et al. | D30/12 |
| 1,971,796 | 8/1934 | Scott | 261/92 X |
| 1,985,854 | 12/1934 | Downes | 261/92 X |
| 2,024,986 | 12/1935 | Durdin, Jr. | 210/628 |
| 2,058,785 | 10/1936 | Goudey et al. | 210/219 |
| 3,232,210 | 2/1966 | Ogle | 261/92 X |
| 3,448,861 | 6/1969 | Berk | 210/256 X |
| 3,719,353 | 3/1973 | Cherne et al. | 261/92 X |
| 3,725,258 | 4/1973 | Spector et al. | 210/220 X |
| 3,747,904 | 7/1973 | Gross | 261/92 |
| 3,941,695 | 3/1976 | Harris | 210/219 X |
| 4,101,384 | 7/1978 | Faust et al. | 261/92 X |
| 4,353,800 | 10/1982 | Besik | 261/92 X |
| 4,364,826 | 12/1982 | Kato | 210/150 |

FOREIGN PATENT DOCUMENTS

| | | | |
|---|---|---|---|
| 1169125 | 12/1958 | France . | |
| 7167 | of 1906 | United Kingdom | 261/92 |

*Primary Examiner*—Tom Wyse
*Attorney, Agent, or Firm*—Jerry T. Kearns

[57] ABSTRACT

A aeration device designed for use in catfish ponds has a support base on which an electric motor and a gear reduction unit are mounted. A cylindrical hub attached for rotation with an output shaft of the gear reduction unit has four evenly spaced radially extending rods. A hollow cylindrical cup is mounted transversely on the free end of each of the rods. The openings of each cup face in the same rotational direction. Four brace struts extend between the radially extending rods, forming a square. In use, the supporting base is situated in a catfish pond, with the motor and gear reduction unit disposed above the water level. At the extreme downward position, each cup will extend about two feet below the water line. As each cup passes through the water, the cup is filled with water which is then carried around a circular arc and dumped from the cup as the cup moves around the arc back toward the surface of the water. In this manner, the water is splashed and aerated before being returned to the water. The cup is divided into two compartments by a central partition. One of the compartments is provided with a spray head and a filling notch.

10 Claims, 4 Drawing Sheets

AERATION DEVICE

BACKGROUND OF THE INVENTION

1. Field of the Invention

The present invention relates to aeration devices, and more particularly pertains to a new and improved aeration device for use in catfish ponds where catfish are raised. To preserve the health of the catfish in the pond, it is necessary to aerate the water in order to supply oxygen for the catfish. Previously, spray aeration pumps and underwater fans have been utilized to aerate catfish ponds. These prior art devices have been found to allow stagnation and stratification of the water adjacent the bottom of the catfish pond. The present invention seeks to overcome this disadvantage by providing an improved aeration device.

2. Description of the Prior Art

Various types of aeration devices are known in the prior art. A typical example of such an aeration device is to found in U.S. Pat. No. 1,971,796, which issued to D. Scott on Aug. 28, 1934. This patent discloses an aeration device which utilizes V-shaped aeration troughs mounted on radially extending arms for rotation about a central hub. U.S. Pat. No. 1,985,854, which issued to F. Downes on Dec. 25, 1934, discloses an aeration device which utilizes troughs mounted on the free ends of radially extending support arms for rotation about a central hub. U.S. Pat. No. 2,024,986, which issued to A. Durdin, Jr. on Dec. 17, 1935, discloses a rotary aeration device for spraying water on an aeration baffle. U.S. Pat. No. 2,058,785, which issued to R. Goudey et al on Dec. 20, 1936, discloses a rotary aeration device which utilizes a vaned impeller for agitating fluid in a container. U.S. Pat. No. 3,448,861, which issued to W. Berk on Jun. 10, 1961, discloses an aeration device for aerating fluid within concentric annular tanks. A rotary cage impeller is provided in each of the annular concentric tanks for aerating the liquid within the tanks. U.S. Pat. No. 3,725,258, which issued to M. Spector et al on Apr. 3, 1973, discloses an aeration device which utilizes a plurality of rotary impellers beneath the surface of a body of water. U.S. Pat. No. 4,353,800, which issued to F. Besik on Oct. 12, 1982, discloses an aeration device which utilizes an endless moving loop of air chambers circulating into and out of a body of water for mixing and aerating the fluid therein. U.S. Design Pat. No. 245,270, which issued to J. Williams et al on Aug. 2, 1977, discloses a device for aerating aquarium tanks. A rotary wheel has a plurality of water receiving chambers into which water is poured from a trough. French Pat. No. 1,169,125, published on Dec. 23, 1958, discloses an aeration device which utilizes submerged rotary impellers having radially extending vanes which rotate about a central hub.

While the above mentioned devices are suited for their intended usage, none of these devices provide an aeration device suitable for usage in catfish ponds. Additionally, none of the aforesaid prior art devices utilize a rotatably driven hub having four radially extending rods with a hollow cylindrical cup mounted at the free end of each rod. Another feature contemplated by the present invention, not disclosed by the previously described patents, is an aeration device which utilizes a rotary wheel with pivotal aeration plates and hollow cylindrical aeration cups. Inasmuch as the art is relatively crowded with respect to these various types of aeration devices, it can be appreciated that there is a continuing need for and interest in improvements to such aeration devices, and in this respect, the present invention addresses this need and interest.

SUMMARY OF THE INVENTION

In view of the foregoing disadvantages inherent in the known types of aeration devices now present in the prior art, the present invention provides an improved aeration device. As such, the general purpose of the present invention, which will be described subsequently in greater detail, is to provide a new and improved aeration device which has all the advantages of the prior art aeration devices and none of the disadvantages.

To attain this, representative embodiments of the concepts of the present invention are illustrated in the drawings and make use of a support base on which an electric motor and a gear reduction unit are mounted. A cylindrical hub is secured for rotation with the rotary output shaft of the gear reduction unit. Four radially extending rods are evenly spaced about the circumference of the cylindrical hub. A hollow cylindrical cup is transversely secured to the free end of each rod. Support brace struts extend between each adjacent pair of rods. In a second embodiment of the present invention, pivotal apertured aeration plates are provided between each pair of adjacent cups. In use, the cups rotate around a circular arc, into and out of a body of water. The cups serves to mix and aerate the water, thus providing a healthier environment for catfish fingerlings.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out it various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved aeration device which has all the advantages of the prior art aeration devices and none of the disadvantages.

It is another object of the present invention to provide a new and improved aeration device which may be easily and efficiently manufactured and marketed.

It is a further object of the present invention to provide a new and improved aeration device which is of a durable and reliable construction.

An even further object of the present invention is to provide a new and improved aeration device which is susceptible of a low cost of manufacture with regard to both materials and labor, and which accordingly is then susceptible of low prices of sale to the consuming public, thereby making such aeration devices economically available to the buying public.

Still yet another object of the present invention is to provide a new and improved aeration device which provides in the apparatuses and methods of the prior art some of the advantages thereof, while simultaneously overcoming some of the disadvantages normally associated therewith.

Still another object of the present invention is to provide a new and improved aeration device which provides an enhanced degree of mixing and aeration of the water in a catfish pond.

Yet another object of the present invention is to provide a new and improved aeration device which utilizes cups rotated about a circular arc for withdrawing water from a pond and splashing the water back into the pond, thus aerating the water.

Even still another object of the present invention is to provide a new and improved aeration device which utilizes pivotal apertured aeration plates for providing an enhanced degree of aeration to the water of the catfish pond.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
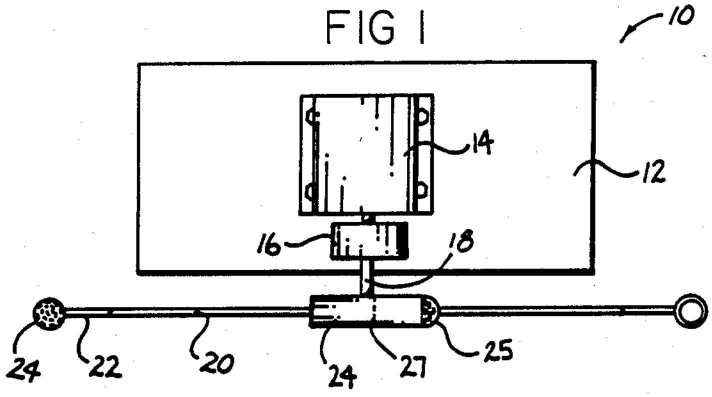
FIG. 1 is a top view of an aeration device according to a first embodiment of the present invention.

With reference now to the drawings, and in particular to FIG. 1 thereof, a new and improved aeration device embodying the principles and concepts of the present invention and generally designated by the reference numeral 10 will be described.

More specifically, it will be noted that the first embodiment 10 of the invention includes a support base 12 on which an electric motor 14 and a gear reduction unit 16 are mounted. A cylindrical hub 26 is mounted for rotation on a rotary output shaft 18 of the gear reduction unit 16. Four radially outwardly extending rods 22 are evenly spaced around the circumference of the hub 26. A brace strut 20 extends between each pair of adjacent rods 22. A plurality of cups 24 are secured to radially outer ends of each of the rods 22. The cups have one open end and an opposite end provided with a spray head 25. Each cup has a central partition wall 27 which divides the cup into two interior compartments. The compartment which communicates with the spray head 25 is provided with a filling notch 29 in the side wall of the cup 24.

Figure 2:
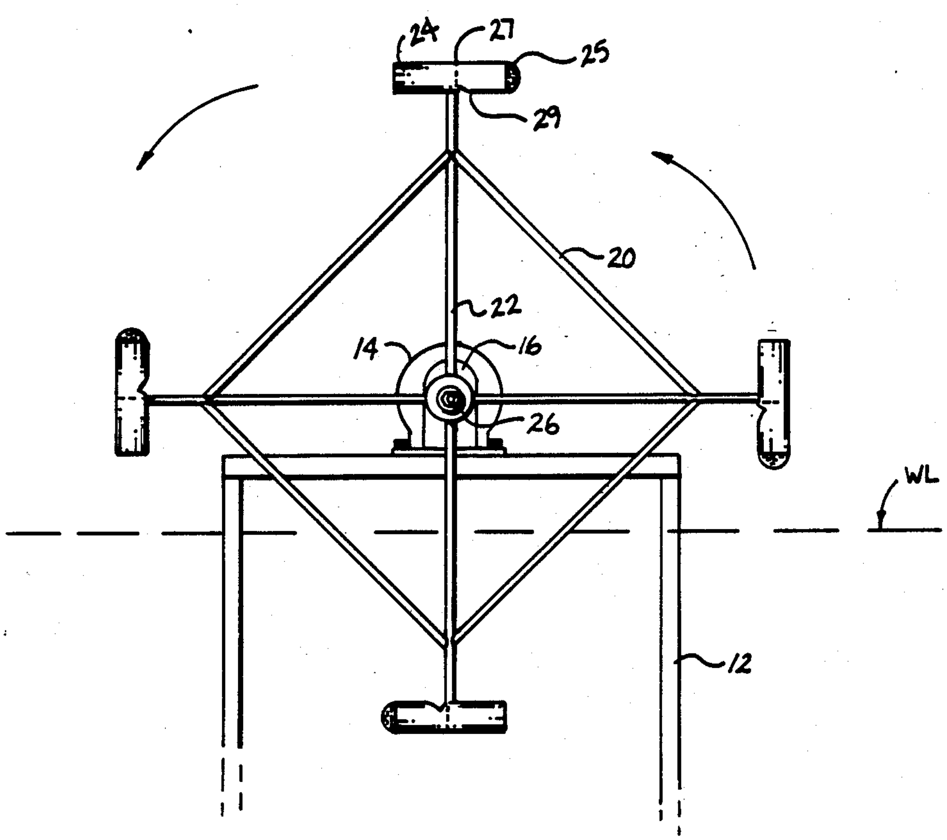
FIG. 2 is a side view of an aeration device according to the first embodiment of the present invention.

As shown in FIG. 2, the brace struts 20 form a square. In operation, the rods 22 and attached cups 24 are rotated in a circular arc in the direction of the arrows. In the extreme bottom position, each cup extends approximately two feet below the water line WL. As each cup 24 rotates upwardly out of the water, the cup is filled with water. As the cup reaches the top of the arc, the water begins to pour out and splashes back into the pond, thus mixing and aerating the water. Water sprays out of the spray head of each cup as the cup leaves the water. As each cup descends downwardly toward the water, water pours out the open end of each cup. As each cup enters the water, the air trapped within the cup bubbles out into the water, thus further aerating the water. In tests, catfish fingerlings raised in ponds equipped with the aeration device of the present invention have been found to be healthier and grow faster than catfish fingerlings raised in ponds equipped with conventional spray type aeration pumps and underwater fans. A one sixth horsepower electric motor is sufficient for powering the device, and uses very little current due to the relatively slow rotation speed of the cups 24.

Figure 3:
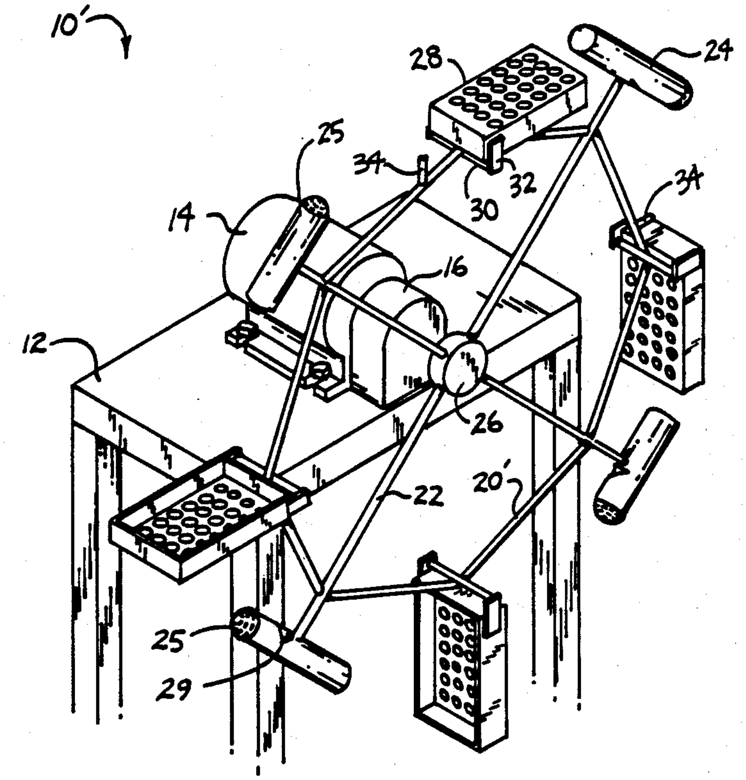
FIG. 3 is a perspective view of an aeration device according to a second embodiment of the present invention.

In FIG. 3, a second embodiment of the aeration device according to the present invention is provided. The second embodiment is constructed in similar fashion as the first embodiment and the same reference numerals have been utilized to identify similar parts. The brace struts 20′ are angled to form a vertex intermediate each pair of rods 22. At the vertex of each of the brace struts 20′, a mounting bar 30 is secured. An apertured aeration plate 28 is pivotally attached to the mounting bar 30 by a mounting bracket 32. A stop 34 on each brace strut 20′ serves to maintain the aeration plate 28 in a radially extending position through a predetermined arc of rotation. Each aeration plate 28 is formed from a shallow box provided with a plurality of holes extending through the bottom of the box. As the cups 24 and aeration plates 28 rotate, the aeration plate 28 will fall by virtue of gravity against the adjacent stop 34, and thus will be maintained in a generally horizontal position as water from the adjacent cup 24 pours onto the aeration plate 28. The water will splash onto and through the holes in the bottom of the aeration plate 28, thus breaking up the water stream and further aerating the water before it returns to the pond.

Figure 4:
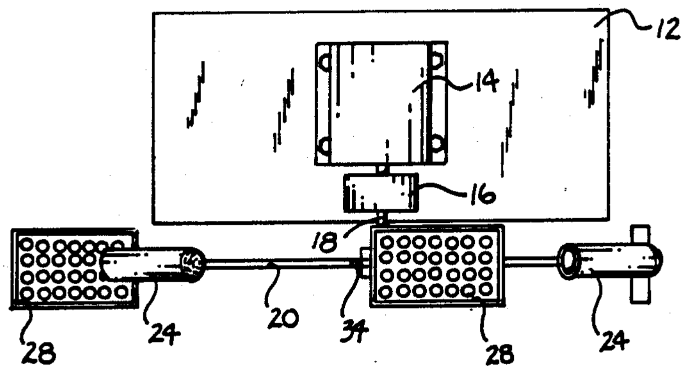
FIG. 4 is a top view of an aeration device according to a second embodiment of the present invention.

In FIG. 4, a top view of the aeration device according to the second embodiment of the present invention is provided.

Figure 5:
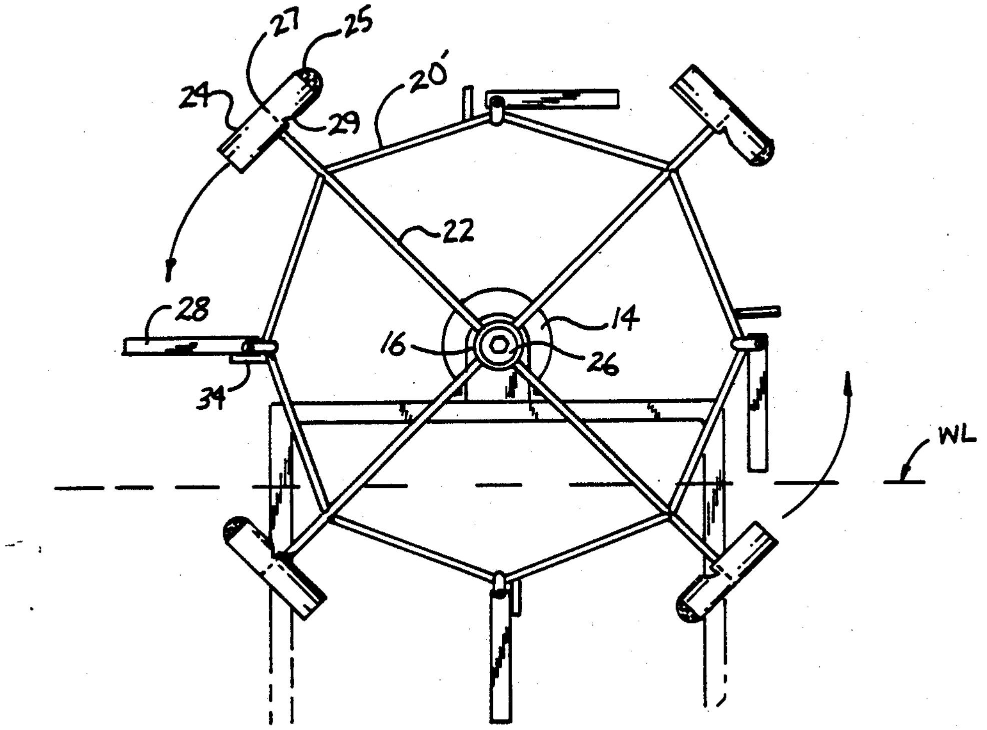
FIG. 5 is a side view of an aeration device according to a second embodiment of the present invention.

In FIG. 5, a side view of the aeration device according to the second embodiment of the present invention is provided. As each aeration plate rotates in the direction of the arrows into the water, the aeration plate 28 is free to pivot against the resistance of the water in the reverse direction, thus minimizing resistance. The aeration plate 28 also provides and enhanced mixing of the water in the pond.

Figure 6:
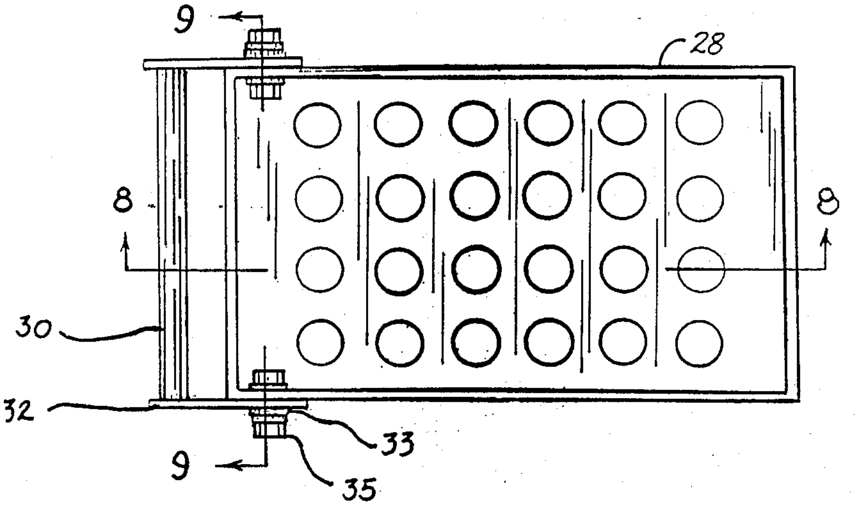
FIG. 6 is a top view of an apertured aeration plate according to the second embodiment of the present invention.

With reference now to FIG. 6, the constructional details of the apertured aeration plate 28 will now be described. A pair of mounting brackets 32 are secured to opposite ends of the mounting bar 30. An axle 35 has a bearing 33 which pivotally mounts the aeration plate 28.

Figure 7:
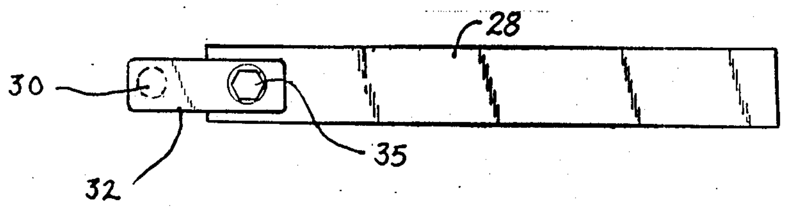
FIG. 7 is a side view of the apertured aeration

As shown in FIG. 7, the axle 35 extends through a side wall of the aeration plate 28.

Figure 8:
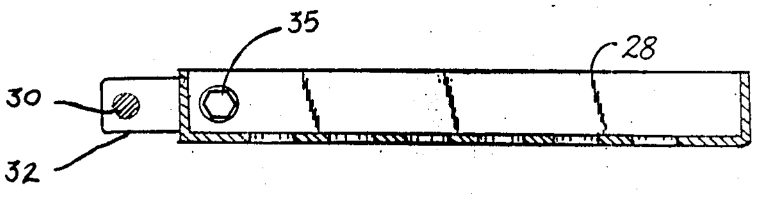
FIG. 8 is a cross sectional view of the apertured aeration plate, taken along line 8—8 of FIG. 6.

As shown in FIG. 8, the bottom surface of the aeration plate 28 is provided with a plurality of spaced circular apertures.

Figure 9:
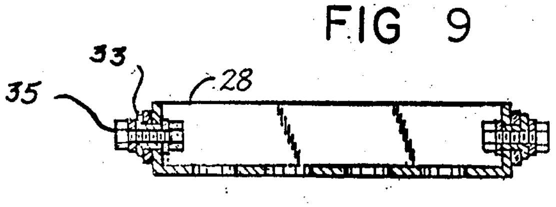
FIG. 9 is a cross sectional view of the apertured aeration plate, taken along line 9—9 of FIG. 6.

In FIG. 9, it may be seen that the bearing 33 supports the aeration plate 28 for pivotal movement about the axle 35.

The various components of the invention may be constructed from aluminum or plastic. It is also contemplated that the legs of the support base 12 may be provided with telescopic adjustability, so that the device may be adapted to ponds of various different depths.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved aeration device, comprising:
support base means;
motor means on said support base;
hub means secured to a rotary output shaft of said motor means;
a plurality of radially extending rod means spaced around the periphery of said hub means;
cup means secured to a free end of each of said rod means; and
brace strut means extending between each pair of adjacent rod means.

2. The aeration device of claim 1, wherein said rod means comprise four radially outwardly extending rods spaced evenly around the periphery of said hub means; and
a brace strut extending between each pair of adjacent rods, said brace struts connected to said rods adjacent said cup means, and said brace struts forming a square.

3. The aeration device of claim 1, wherein said rod means comprises four radially outwardly extending rods spaced evenly around the periphery of said hub means;
an angled brace strut extending between each pair of adjacent rods, said angled brace struts connected to said rods adjacent said cup means, said angled brace struts forming an octagon.

4. The aeration device of claim 1, further comprising an apertured aeration plate pivotally connected between each of said cup means.

5. The aeration device of claim 4, wherein a brace strut extends between each adjacent pair of rod means; and
said aeration plate is pivotally connected to said brace strut.

6. The aeration device of claim 5, further comprising stop means on said brace strut for maintaining said aeration plate in a radially extending orientation through a predetermined angle of rotation.

7. The aeration device of claim 1, further comprising gear reduction means between said motor means and hub means.

8. The aeration device of claim 1, further comprising a central partition wall in each of said cup means creating two separate chambers;
one end of each of said cup means being open and an opposite end having a spray head; and
a notch in said cup means for filling a compartment adjacent said spray head.

9. A new and improved aeration device, comprising:
a support base;
a motor mounted on said support base;
a gear reduction unit on said support base operably connected to a rotary output shaft of said motor;
a cylindrical hub secured for rotation with a rotary output shaft of said gear reduction unit;
four radially outwardly extending rods spaced evenly around the circumference of said hub;
a hollow cylindrical cup secured to a feee end of each of said rods;
openings of each of said cups facing in the same rotational direction;
a central partition wall in each of said cup means creating two separate chambers;
one end of each of said cup means being open and an opposite end having a spray head;
a notch in said cup means for filling a compartment adjacent said spray head;
an angled brace strut extending between each pair of adjacent rods, said angled brace struts connected to said rods adjacent said cups, said angled brace struts forming an octagon;
a mounting bar attached at a vertex of each angled brace strut;

an apertured aeration plate pivotally connected to each of said mounting bars; and stop means for maintaining said aeration plate in a radially extending orientation through a predetermined angle of rotation.

10. A new and improved aeration device, comprising:

a support base;

a motor mounted on said support base;

a gear reduction unit on said support base operably connected to a rotary output shaft of said motor;

a cylindrical hub secured for rotation with a rotary output shaft of said gear reduction unit;

four radially outwardly extending rods spaced evenly around the circumference of said hub;

a hollow cylindrical cup secured to a free end of each of said rods;

openings of each of said cups facing in the same rotational direction;

a central partition wall in each of said cup means creating two separate chambers;

one end of each of said cup means being open and an opposite end having a spray head;

a notch in said cup means for filling a compartment adjacent said spray head; and a brace strut extending between each pair of adjacent rods, said brace strut connected to said rods adjacent said cups, and said brace struts forming a square.

* * * * *